(12) United States Patent
Hayashi

(10) Patent No.: US 7,556,285 B1
(45) Date of Patent: Jul. 7, 2009

(54) AIRBAG COVER, INSTRUMENT PANEL, AIRBAG DEVICE AND AIRBAG CASING

(75) Inventor: Shinji Hayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/292,591

(22) Filed: Nov. 21, 2008

(30) Foreign Application Priority Data

Feb. 6, 2008 (JP) ............................. 2008-026774

(51) Int. Cl.
*B60R 21/20* (2006.01)

(52) U.S. Cl. .................................. 280/728.3

(58) Field of Classification Search ............. 280/728.3, 280/732
See application file for complete search history.

(56) References Cited

U.S. PATENT DOCUMENTS

| 5,082,310 A | * | 1/1992 | Bauer ......................... 280/732 |
| 5,435,596 A | * | 7/1995 | Rose et al. ................ 280/728.2 |
| 6,601,870 B2 | * | 8/2003 | Suzuki et al. ............. 280/728.3 |
| 2003/0189321 A1 | * | 10/2003 | Takahashi ................ 280/728.3 |

FOREIGN PATENT DOCUMENTS

| JP | 2001-294114 | 10/2001 |
| JP | 2004-001635 | 1/2004 |
| JP | 2004-175305 | 6/2004 |
| JP | 2004-338092 | 12/2004 |

\* cited by examiner

*Primary Examiner*—Faye M. Fleming
(74) *Attorney, Agent, or Firm*—Manabu Kanesaka

(57) ABSTRACT

An airbag cover for a vehicle includes a casing for an airbag; a top portion for covering the airbag; a tear line; an opening portion; an intermediary portion interposed between the top portion and the airbag, and having a flap portion and a hinge, the flap portion pivoting at the hinge; and a plurality of welding ribs vertically disposed between the intermediary portion and the top portion. The welding ribs have a first welding rib in a peripheral area of the flap portion or the hinge, and a second welding rib other than the first welding rib. The intermediary portion is vibration-welded. The first welding rib has a vertical height so as to contact the top portion before the second welding rib does so that the first welding rib has strength greater than that of the second welding rib.

9 Claims, 6 Drawing Sheets

REAR OF A VEHICLE ← → FRONT OF A VEHICLE

REAR OF A VEHICLE ←

FRONT OF A VEHICLE →

AIRBAG COVER, INSTRUMENT PANEL, AIRBAG DEVICE AND AIRBAG CASING

BACKGROUND OF THE INVENTION AND RELATED ART STATEMENT

The present invention relates to a technique for constructing an airbag cover to be installed for a passenger seat of a vehicle.

In the following Patent Document 1(Japanese Unexamined Patent Application Publication No. 2004-001635) for example, an example of a conventional passenger airbag device is disclosed. In this passenger airbag device, there is provided a tear line in the airbag cover for tearing the airbag cover covering an passenger airbag, and the airbag cover is configured so as to be torn along the tear line to allow an opening to be deployed upon occurrence of a vehicle collision, and to allow the passenger airbag to expand to the outside of the airbag cover. In addition, in an airbag cover of this kind, it is common that a top portion of the airbag cover and a joint portion located at a backside of the top portion are joined by means of a vibration welding, using the welding ribs vertically disposed therebetween.

By the way, in an airbag device of this kind, the opening of an airbag cover is configured so as to be deployed toward the side of an occupant as being pushed by an expanding airbag, and therefore a pushing load from the airbag concentrates onto the opening or a particular area therearound, compared to other portions of the airbag cover. For this reason, it is required to secure the strength of the airbag cover in said area.

Accordingly, the present invention has been made in view of the above problem in an airbag cover provided for a passenger seat of a vehicle. The object of the invention is to provide a technique effective to enhance the joint strength of the welding in a particular area between a top portion constituting the opening and a backside of the top portion through a plurality of welding ribs thereby securing the strength of the airbag cover in the particular area.

Further objects and advantages of the invention will be apparent from the following description of the invention.

SUMMARY OF THE INVENTION

In order to solve the above problem, the present invention has been made. An airbag cover according to the present invention is an airbag cover to be installed for a passenger seat of a vehicle. The airbag cover in the present invention includes at least a casing, a top portion, a tear line, an opening, an intermediary portion, a plurality of welding ribs, and a flap portion.

The casing has a configuration for accommodating an airbag expanded toward an occupant on a passenger seat upon occurrence of an accident. This airbag is preferably accommodated in a state of being folded in advance into a predetermined folding state such as roll folding, accordion folding, mechanical folding, or the like. As to the term "accommodating" an airbag in the casing of the airbag herein described, various methods for enclosing directly or indirectly the whole or a part of the airbag are widely included. The top portion is configured to extend between the casing of airbag and the occupant on the passenger seat, and to cover the airbag accommodated in the casing.

The tear line is configured as a tear line (planned tear line) for tearing the airbag cover formed in the top portion. This tear line is a portion that is reduced in thickness in the thickness direction of the top portion typically by ultrasonic processing or laser processing, and occasionally called a "thin thickness portion" or a "reduced thickness portion". It is preferable that this tear line corresponds to a portion or the whole of a tear line that is actually torn along the tear line. That is, the tear line is required to have just a function to form such a tear line that causes the airbag cover to be torn as desired, and a tear line exceeding said tear line is allowed to be formed. The opening is configured to be a portion that is partitioned by the tear line in the top portion. The intermediary portion is configured to be a portion that is fixed to the backside of the top portion and intermediates along the top portion between the top portion and the airbag accommodated in the casing.

The terms "backside of the top portion" herein described is a face of the top portion on the opposite side relative to an occupant when the face of the top portion facing the occupant is the front face. Accordingly, the intermediary portion can be called in other words to be a backside member that is fixed to the backside of the top portion (the opposite side relative to the occupant). The plurality of welding ribs are configured to be portions that are vertically disposed between the intermediary portion and the top portion, the portion serving for vibration welding. With respect to a mode of construction of the plurality of welding ribs vertically disposed, it is possible to employ, depending on needs, a first configuration in which they are vertically disposed from the intermediary portion to the side of the top portion, a second configuration in which they are vertically disposed from the top portion to the side of the intermediary portion, or a third configuration in which the first and second configurations are combined. The plate-like flap portion included in the intermediary portion is configured to be a portion that extends so as to face the opening portion, and is allowed to be open up to the side of the opening portion as being pivoted at a hinge portion serving as a pivot point.

Particularly, the intermediary portion in the airbag cover is vibration-welded to be integrated with the top portion at a tip portion of each of the plurality of welding ribs, and the flap portion is opened up as being pivoted at the hinge portion serving as a pivot point toward the side of the occupant on the passenger seat together with the opening portion torn at the tear line, by being pushed from the side of the casing by the airbag being expanded. That is, the opening is formed in the airbag cover, the opening allowing projecting movement of the airbag, being inflated and expanding, by opening operation of a opening door, which is configured from the flap portion and the opening so as to be one integrated piece. As to the vibration welding, the intermediary portion and the top portion are joined to each other through the intermediary of the plurality of welding ribs by vibration welding operation that provides relative vibration in a vibration direction along the extension surface of the intermediary portion or the top portion. In a configuration like this, since a pressing load from the airbag may be concentrated onto a particular peripheral area of the opening of the flap portion or a particular peripheral area of the hinge portion in the airbag cover, there is a need to secure the strength of the airbag cover in the peripheral area.

For this reason, in the airbag cover according to the present invention, with respect to a first welding rib in the plurality of welding ribs disposed in a peripheral area of the opened-up portion of the flap portion or the peripheral area of the hinge portion, the first welding rib has a vertical height, due to which the first welding rib contacts the top portion with a priority, higher than the second welding rib forming other than the first welding rib when allowed to contact and welded to the top portion by vibration welding during the vibration welding of the intermediary portion. The "peripheral area of the opened-up portion of the flap portion" herein described is typically a neighboring area of an opened-up end (opened-up edge) of the flap portion and a neighboring area of the tear line. Therefore, more specifically speaking, it is possible to use a welding rib in the plurality of welding ribs as the first welding rib to be disposed in the peripheral area of the opened-up portion of the flap portion, the welding rib being disposed in a portion most close to the opened-up end of the flap portion or a portion most close to the tear line.

Incidentally, the "peripheral area of the hinge portion" herein described is typically a neighboring area around the hinge portion and a neighboring area of the tear line. Therefore, more specifically speaking, it is possible to use a welding rib in the plurality of welding ribs as the first welding rib to be disposed in the peripheral area of the hinge portion, the welding rib being disposed in a portion most close to the hinge portion or a portion most close to the tear line. Thereby, the intermediary portion is configured so that the strength of the welded joint in the particular peripheral area, where it is vibration welded with the top portion through the first welding rib, is higher than that in the area where it is vibration welded through the second welding rib. That is, since vibration energy during vibration welding tends to be concentrated to the first welding rib compared to the second welding rib, the strength of the welded joint for the particular peripheral area of the hinge portion, which is joined by being welded through the first welding rib, is relatively enhanced. As a result, it becomes possible to enhance the welded joint strength in a particular area between the top portion constituting the opening door of the airbag cover and the intermediary portion joined to the backside of the top portion through the plurality of welding ribs thereby securing the strength of the airbag cover in the particular area.

It is noted that the height of the first welding rib to realize a joint construction that gives a high priority to the top portion preferably depends on relative locations and gaps between the top portion and the intermediary portion. For example, in the case that the top portion and the intermediary portion extend substantially in parallel, and gaps between the top portion and the intermediary portion are substantially uniform in respective areas, it is only required that the first welding rib is configured to have a vertical height higher than that of the second welding rib, while in the case that gaps between the top portion and the intermediary portion are different in the whole area or in a part of the area, it is required that the first welding rib be configured to have a vertical height higher than that of the second welding rib, but also that the first welding rib be configured to have the vertical height lower than that of the second welding rib.

In addition, in an airbag cover of a different type according to the present invention, it is preferable that the first welding rib is configured so that its vertical height when vibration welded is higher than that of the second welding rib, and thereby the first welding rib contacts the top portion with a high priority when the intermediary portion is vibration welded. According to a configuration like this, the first welding rib is allowed to contact with the top portion with a high priority by a simple configuration such that the first welding rib disposed in a particular area has a vertical height higher than that of the second welding rib. Therefore, an airbag cover having enhanced strength of the welded joint of vibration welding is provided.

An instrument panel according to the present invention is an instrument panel extending longitudinally in a lateral direction of the vehicle in front of a front seat, and has a configuration in which the above airbag cover is integrated therein as one piece. According to a configuration like this, an instrument panel having an airbag cover integrated thereinto is provide, the airbag cover having secured strength in a particular area. Incidentally, the "instrument panel" herein described is a panel body (also called a "dashboard") extending in a lateral direction of the vehicle in front of a driver seat and a passenger seat in a vehicle cabin, i.e., between a front window and an occupant on the front seat, and it is defined to be not only a panel around instruments such as a speed meter, a tachometer, or the like in front of the driver seat, but also the whole area of the panel including a glove box on the passenger seat side for accommodating small articles and also a portion in which a passenger seat airbag module, and the like. Furthermore, an air discharge port of a car air conditioner and a portion in which a car stereo is housed may also be included in the "instrument panel".

An airbag device according to the present invention includes at least an airbag, a gas supply device, an airbag cover. The airbag is configured to be an airbag expanding toward an occupant on a passenger seat upon occurrence of an accident, and restraining the occupant on the passenger seat. The gas supply device is configured to be a gas supply device for supplying expansion gas to the airbag, and typically has both functions of generating gas for expanding the airbag and of leading the gas to the airbag side. The airbag cover is an airbag cover intermediating between the airbag and the occupant on the passenger seat, and is configured particularly as an airbag as described above. According to a configuration like this, an airbag device with an airbag cover having the strength of a particular area secured is provided.

A casing of the airbag according to the present invention is configured to be an airbag accommodating body for accommodating an airbag expanded toward an occupant on a passenger seat upon occurrence of an accident, the airbag accommodating body or the casing being mounted in correspondence to a passenger seat of a vehicle. In the terms "accommodating" an airbag in the casing herein described, forms of enclosing directly or indirectly the whole or a portion of the airbag are widely included. This casing includes at least an intermediary portion, a plurality of welding ribs, and a plate-like flap portion. The intermediary portion is configured to be a portion allowed to be fixed to the backside of a top portion of the airbag cover, and also intermediating along the top portion between the top portion and the airbag in a state of being accommodated. The plurality of welding ribs is vertically disposed for vibration welding in the intermediary portion. The flap portion is configured to be a plate-like portion allowed to be open up as being pivoted at a hinge portion serving as a pivot point, the plate-like flap portion being included in the intermediary portion.

Particularly, the intermediary portion in this casing configured as described above is vibration-welded to be integrated with the top portion at a tip portion of each of the plurality of welding ribs, and the flap portion is opened up as being pivoted at the hinge portion serving as a pivot point toward the side of the occupant on the passenger seat together with the opening of the top portion, by being pushed by the airbag being expanded. Moreover, in the casing, with respect to a first welding rib in the plurality of welding ribs disposed in a peripheral area of the opened-up portion of the flap portion or the peripheral area of the hinge portion, the first welding rib is configured to have a vertical height to contact with the top portion with a priority higher than the second welding rib when allowed to contact and welded to the top portion by vibration welding on the occasion of vibration welding of the intermediary portion. According to a configuration like this, it becomes possible to enhance the strength of the welded joint in a particular area between the top portion of the airbag cover constituting the opening door and the intermediary portion joined to the backside of the top portion through the plurality of welding ribs. Therefore, a casing effective to secure the strength of the airbag cover in the area is provided.

In addition, in a casing of a different type according to the present invention, the first welding rib is preferably configured so as to have a vertical height higher than the second welding rib, thereby contacting the top portion with a high priority during the vibration welding of the intermediary portion. According to a configuration like this, the first welding rib is allowed to contact the top portion with a high priority by a simple configuration such that the first welding rib disposed in a particular area has a vertical height higher than the second welding rib. Therefore, a casing having enhanced strength of the welded joint by the vibration welding is provided.

As described above, according to the present invention, in an airbag cover installed in a passenger seat of a vehicle, a first welding rib in the plurality of welding ribs disposed in a peripheral area of the opened-up portion of the flap portion or the peripheral area of the hinge portion is configured to have such a vertical height that it contacts the top portion with a priority higher than the second welding rib during the vibration welding. Therefore, it becomes possible to enhance the strength of the welded joint in a particular area between the top portion of the airbag cover constituting the opening door and the intermediary portion joined to the backside of the top portion through the plurality of welding ribs. Furthermore, it becomes possible to secure the strength of the airbag cover in the area.

DETAILED DESCRIPTION OF THE PREFERRED EMBODIMENTS

An airbag device 100 that is an embodiment of an "airbag device" in the present invention will be described below with reference to the attached drawings. This airbag device 100 is, although not particularly shown, constructed as a passenger airbag device that restrains an occupant on a passenger seat by an airbag (airbag 110 described later), which is provided for a passenger seat of a vehicle and expands in the event of a vehicle accident.

Figure 1:
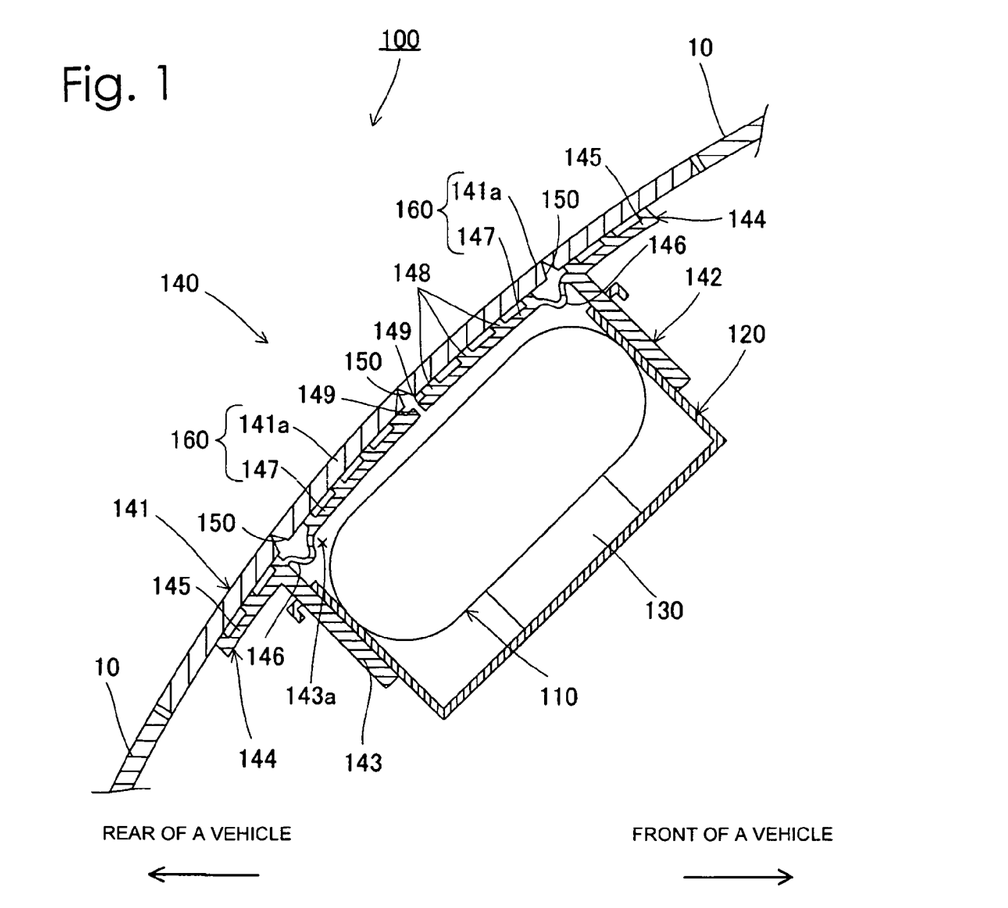
FIG. 1 is a view showing a sectional construction of an airbag device of this embodiment.
Figure 2:
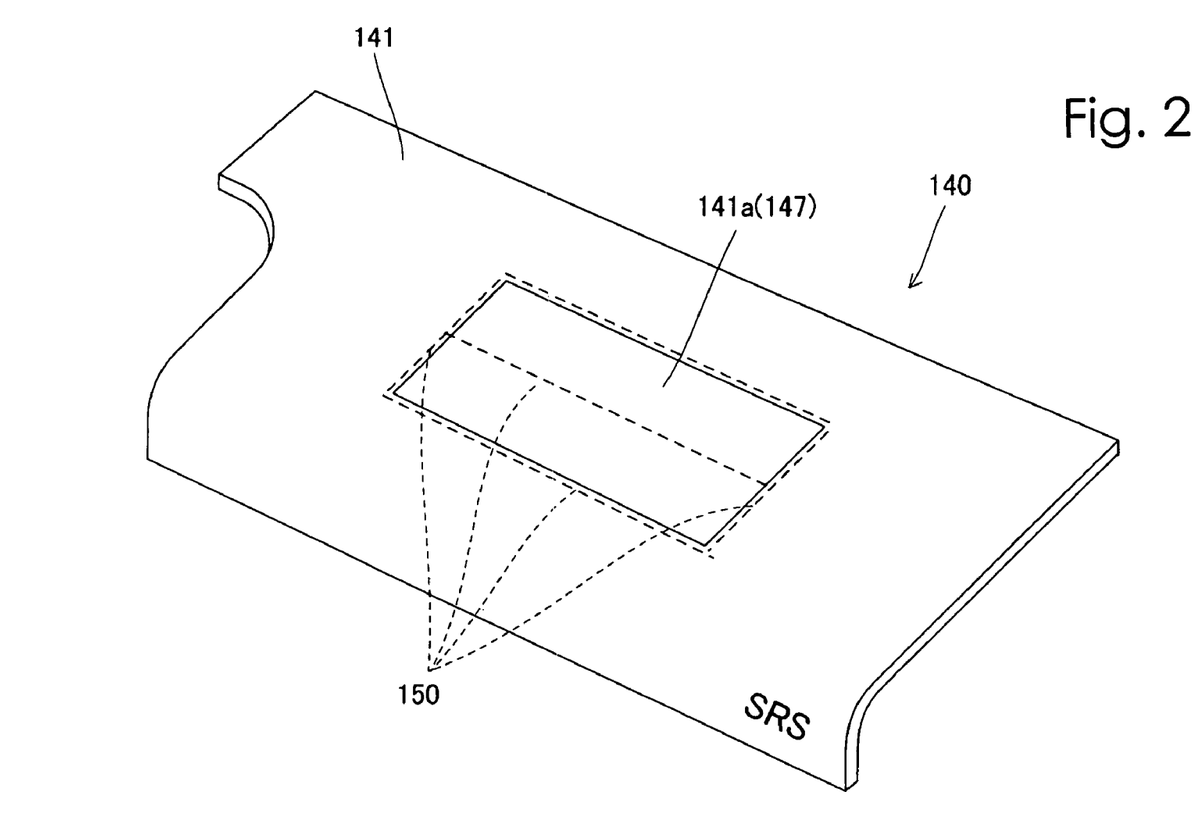
FIG. 2 is a perspective view of an airbag cover in FIG. 1 seen from an occupant side.

An overall construction of the airbag device 100 is referred to FIG. 1 and FIG. 2. Here, a sectional construction of the airbag device 100 of this embodiment is shown in FIG. 1, and a perspective view of an airbag cover 140 in FIG. 1 seen from an occupant side is shown in FIG. 2.

As shown in FIG. 1, the airbag device 100 of this embodiment is composed mainly of an airbag 110, a retainer 120, an inflator 130 and an airbag cover 140. This airbag device 100 is configured so as to be installed to a vehicle in a state of being integrated into modules together with the airbag 110 and other constituent members, and also so called an "airbag module".

The airbag 110 has a function that expands as being projected into the region where an occupant on a passenger seat side is restrained and restrains the occupant seated on a passenger seat in the event of a vehicle accident. This airbag equates to the "airbag" in the present invention. The retainer 120 has a function as a casing or an airbag accommodating body for accommodating the airbag 110, which is folded in advance into a predetermined folding form (roll folding, accordion folding, mechanical folding, or the like), and mounted on the backside of the airbag cover 140, i.e., on a portion at the opposite side of the occupant on the passenger seat. The inflator 130 has a function as a gas supply means that generates gas for expansion and supplies it to the airbag 110 in the event of a vehicle accident. This inflator 130 constitutes the "gas supply means" in the present invention.

The airbag cover 140 is disposed so as to be connected to an instrument panel 10 of the vehicle and has a function as a cover body that covers the airbag 110 in a state of being accommodated in the retainer 120. This airbag cover 140 includes at least a top portion 141, a frame-like body 142, tear lines 150, and a pair of opening door portions 160, 160. This airbag cover 140 equates to the "airbag cover" in the present invention. Moreover, this airbag cover 140 is configured so as to enclose directly or indirectly the whole or a part of the airbag 110 through the intermediary of the frame-like body 142, and constitutes the "casing" or "airbag accommodating body" in the present invention.

Incidentally, the instrument panel 10 is an instrument panel extending longitudinally in a lateral direction in front of the front seats of the vehicle, and is configured so as to be provided with the airbag cover 140 in a state of being integrated by vibration welding or the like. This instrument panel 10 is a panel body (also called a "dashboard") extending in the lateral direction of the vehicle in front of a driver seat and a passenger seat in a vehicle cabin, i.e., between a front window and an occupant on the front seat, and it is defined to be not only a panel around instruments such as a speed meter, a tachometer, or the like in front of the driver seat but also the whole area of the panel including a portion in which the airbag 110 of this embodiment and the like are mounted, and also a glove box on the passenger seat side for accommodating small articles. Furthermore, an air discharge port of a car air conditioner and a portion in which a car stereo is housed may also be included in the instrument panel 10. The instrument panel 10 herein described equates to the "instrument panel" in the present invention.

The top portion 141 is configured to be a plate-like portion extending along a surface opposite to an occupant on the passenger seat between the retainer 120 and the occupant on the passenger seat, and has a function for covering the airbag 110 accommodated in the retainer 120. This top portion 141 is formed of a resin material such as PP (polypropylene) material, TPO (olefin based elastomer) material, or the like. Moreover, there is a case where a coat made of resin is coated on its outer surface. The top portion 141 herein described equates to the "top portion" in the present invention.

On the back of the top portion 141, i.e., on a face opposite with respect to the occupant on the passenger seat among portions of the top portion 141, there are formed tear lines 150, which are configured as planned tear lines for tearing the airbag cover. These tear lines 150 are portions which are reduced in thickness in the thickness direction of the top portion 141 typically by ultrasonic processing or laser processing, and occasionally called "thin thickness portion" or "reduced thickness portion". The tear lines 150 equate to the "tear lines for tearing an airbag cover" in the present invention.

Opening portions 141a, 141a of the top portion 141, which are partitioned by the tear lines 150, are developed (also said as "are opened up") as opening doors formed together with flap portions 147, 147 described later due to rupture at the tear lines 150 when the airbag 110 is expanded. Incidentally, the tear lines 150 correspond to a portion or the whole tear lines that are actually torn along the tear lines 150. That is, the tear lines 150 are required to have just a function to form such tear lines that cause the airbag cover 140 to be torn as desired, and tear lines exceeding the tear lines 150 are allowed to be formed. The opening portions 141a, 141a herein described equate to the "opening portions" in the present invention.

In this embodiment, the frame-like body 142 is also joined on the back of the top portion 141. The frame-like body 142 is provided with a rectangular cylindrical portion 143 fixed to the retainer 120. This cylindrical portion 143 is provided with an intermediary portion 144 that intermediates along the top portion 141 between the top portion 141 and the airbag 110 accommodated in the retainer 120. The intermediary portion 144 is fixed to be covered on the backside of the top portion 141, and is configured as a member that intermediates between the top portion 141 and the airbag 110 accommodated in the retainer 120. The "back of the top portion 141" herein described is a face opposite with respect to the occupant on the passenger seat among portions of the top portion 141, when the face of the top portion 141 opposite to the occupant on the passenger seat is taken as a surface. Therefore, the intermediary portion 144 can be said in other words to be a "backside member" to be fixed to be covered on the backside of the top portion 141 (opposite with respect to the occupant on the passenger seat). The intermediary portion 144 includes a base portion 145 extending from a wall portion of the cylindrical portion 143 to the outside thereof and a pair of flap portions 147, 147 each extending from a wall portion of the cylindrical portion 143 to the inside thereof via a hinge portion 146. Each of the flap portions 147, 147 is a flat plate-like member as a whole, as shown in FIG. 2, and has a rectangular shape substantially matching to the opening portion 141a to which it faces. The flap portions 147 and the opening portions 141a facing each other respectively extend so as to oppose to each other, and are each configured to be a plate-like flap portion, which is allowed to open toward the side of the opening portion 141a as being pivoted at the adjacent hinge portion 146 serving as a pivot point. Actuation of opening up or opening/closing of an upper opening 143a of the cylindrical portion 143 is enabled by opening each of the flap portions 147. The intermediary portion 144, the hinge portions 146 and the flap portions 147 herein described equate to the "intermediary portion", the "hinge portions" and the "flap portions", respectively, in the present invention.

As to the joint of the top portion 141 and the frame-like body 142, they are mutually welded and integrally joined by a known vibration welding method using a plurality of welding ribs 148 vertically disposed in the thickness direction of the top portion 141 on the top face (face opposite to the top portion 141) side of the frame-like body 142, i.e., at the intermediary portion 144 (the base portion 145 and the flap portions 147). Typically, in a vibration welding operation, the top portion 141 and the frame-like body 142 are mutually joined through intermediary of the plurality of welding ribs 148 by being relatively vibrated in the direction along the surface in which the top portion 141 and the intermediary portion 144 extend. At this time, the efficiency of vibration welding can be increased by the structure such that the longitudinal direction of the plurality of welding ribs 148 corresponds to the vibration direction.

Figure 3:
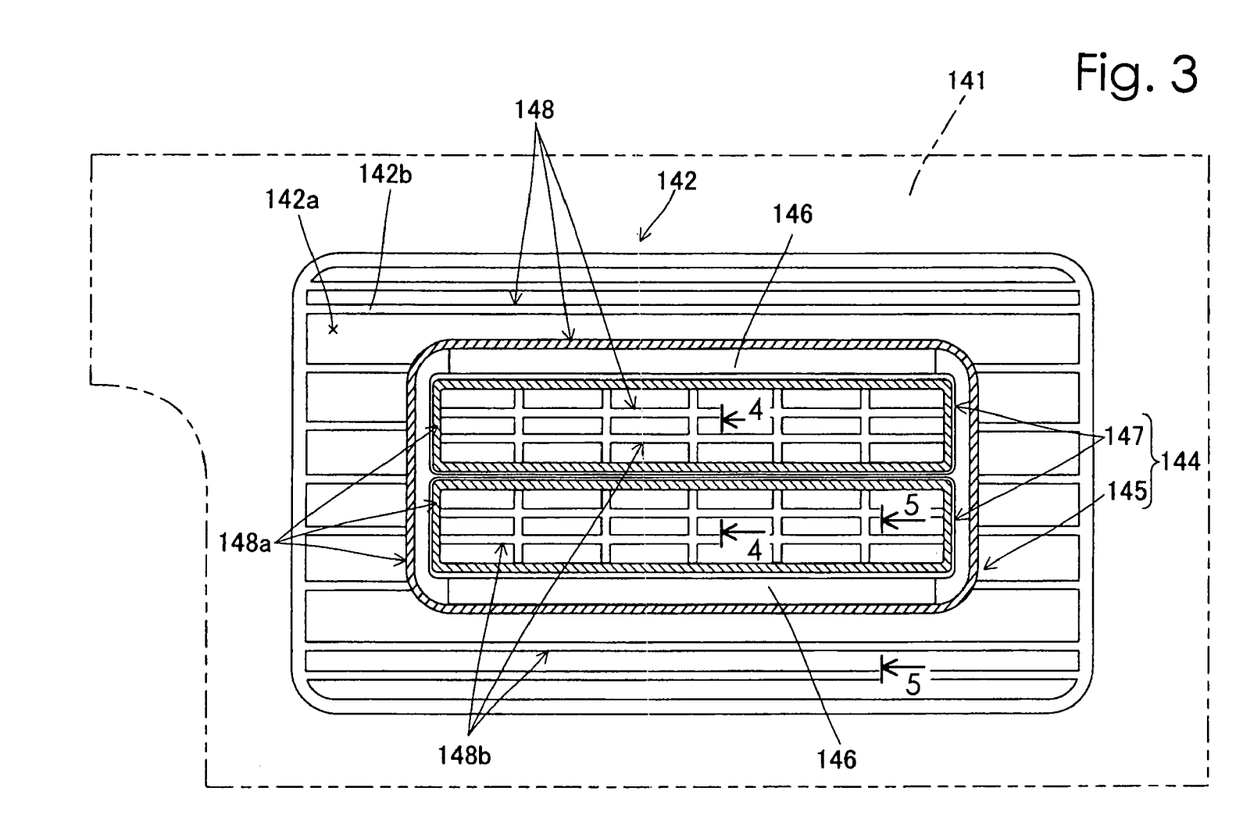
FIG. 3 is a plan view of a frame-like body of this embodiment seen from the upside.
Figure 4:
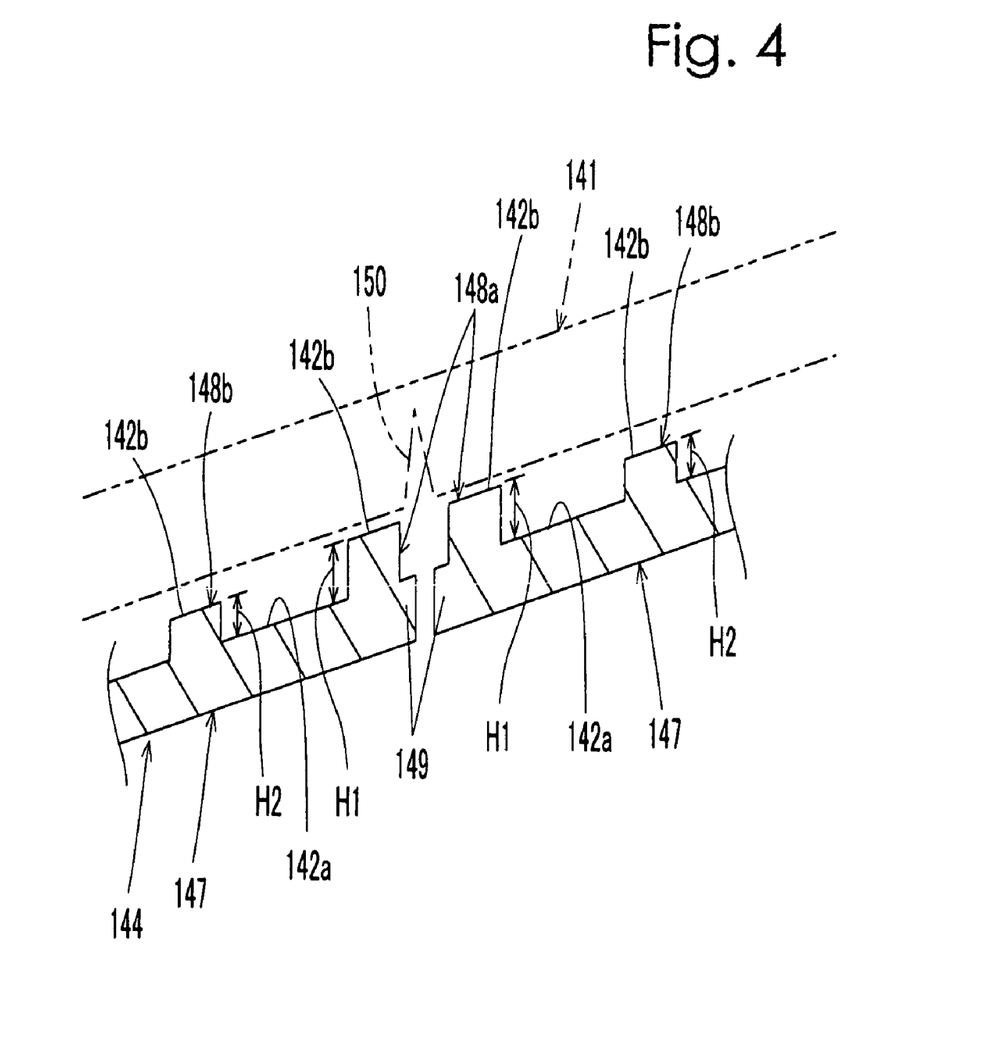
FIG. 4 is a cross sectional view taken along line 4-4 of the frame-like body in FIG. 3.
Figure 5:
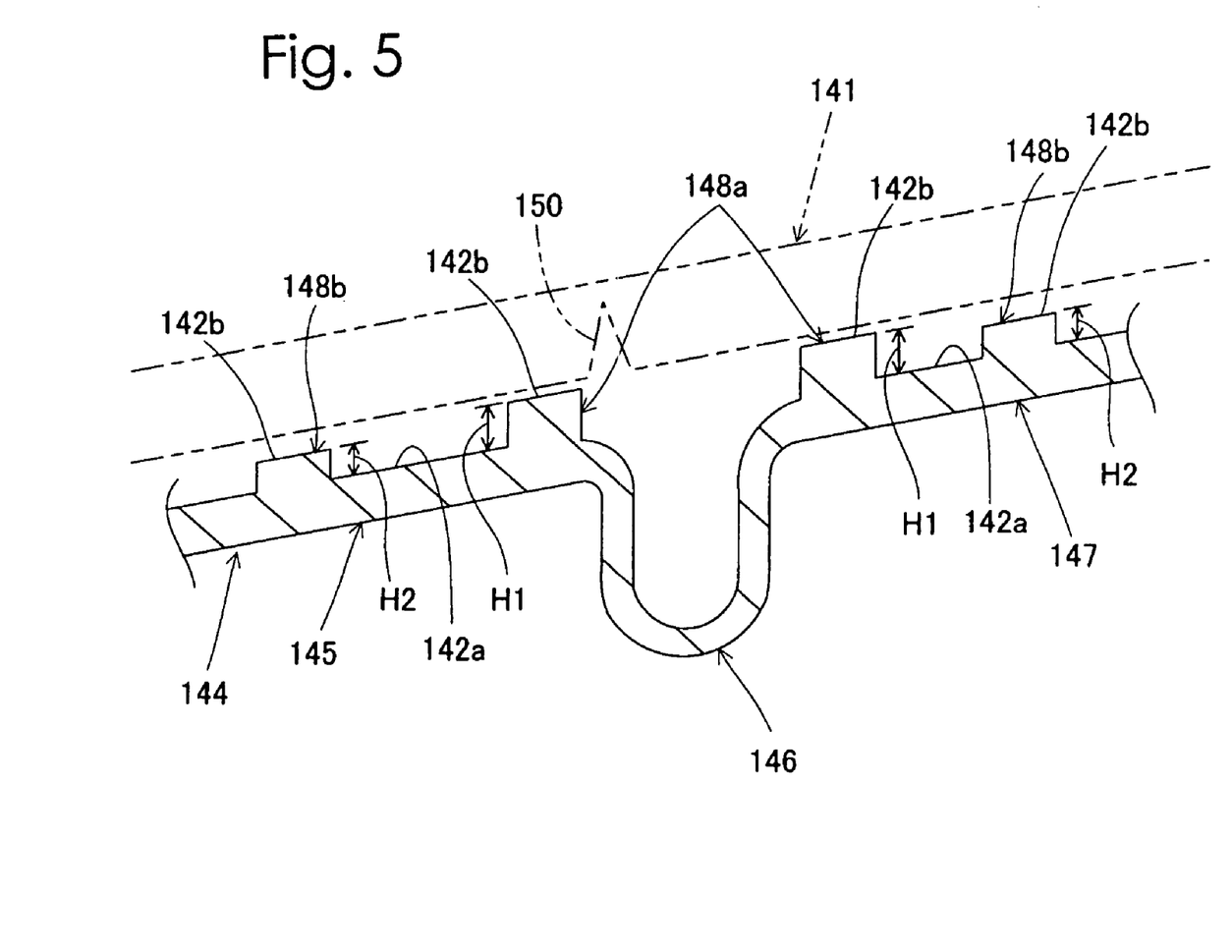
FIG. 5 is a cross sectional view taken along line 5-5 of the frame-like body in FIG. 3.

The configuration of the topside of the frame-like body 142 is referred to FIG. 3 to FIG. 5. Here, in FIG. 3, a plan view of the frame-like body 142 of this embodiment seen from the top side is shown. And, a cross section view taken along line 4-4 of the frame-like body 142 in FIG. 3 is shown in FIG. 4, and a cross section view taken along line 5-5 of the frame-like body 142 in FIG. 3 is shown in FIG. 5.

As shown in FIG. 3, on the topside of the frame-like body 142 facing the opening portions 141a, 141a, there are provided a plurality of welding ribs 148 vertically disposed from a topside bottom portion 142a to a topside apex portion 142b, and the plurality of welding ribs 148 are configured to extend in a horizontal direction (horizontal direction in FIG. 3) and in a vertical direction (vertical direction in FIG. 3). In the frame-like body 142, the plurality of welding ribs 148 are formed in a grating shape in a horizontal direction and a vertical direction particularly on the top face of the flap portions 147, 147. The plurality of welding ribs 148 herein described equate to the "a plurality of welding ribs" in the present invention.

By the way, the flap portions 147 described above are each configured such that it is pushed out from the side of retainer 120 together with the opening portion 141a torn at tear lines 150 due to expansion of the airbag 110, and an opened-up end 149 is opened up to the side of the occupant on the passenger seat by allowing the hinge portion 146 to serve as a pivot point. In a configuration like this, it is known that the load when the airbag 110 is expanded tends to be concentrated particularly onto a peripheral area (corresponding to the "peripheral area" in the present invention) of the opened-up portion of each of the flap portions 147 or the peripheral area of each of the hinge portions 146 of the top portion 141 and the frame-like body 142 in comparison to other areas. "The peripheral area of the opened-up portion of each of the flap portions 147" herein described is typically an area close to the opened-up end (opened-up edge) 149 of each the flap portions 147 and areas close to the tear lines 150 of the top portion 141. In addition, "the peripheral area of each of the hinge portions 146" is typically a vicinity of each of the hinge portions 146 and an area close to the tear lines 150 of the top portion 141. Accordingly, in the frame-like body 142 of this kind, it is required that the strength of an airbag cover in the particular area, where the load when the airbag 110 is expanded tends to be concentrated, is secured.

Hence, the present inventor has diligently studied on a welded joint structure for joining the top portion 141 and the frame-like body 142 in order to secure the strength of an airbag cover in the peripheral area described above. On the basis of the results of the study, the present inventor employed such a configuration that the strength of the welded joint for first welding ribs 148a (shown with a diagonal hatch pattern in FIG. 3) disposed in the peripheral area of the opened-up portion of each of the flap portions 147 or the peripheral area of each of the hinge portions 146 among the plurality of welding ribs 148 vertically disposed between the top portion 141 and the frame-like body 142 becomes higher than that of second welding ribs 148b.

In this configuration, while a conventional method of vibration welding is followed, a construction is proposed that the first welding ribs 148a, which are required to have relatively higher strength of the welded joint among the plurality of welded joints 148, are vibration-welded with a priority higher than the second welding ribs 148b. Incidentally, as shown in FIG. 3, the first welding ribs 148a are constituted of welding ribs disposed along the edge portion of each of the flap portions 147 of the intermediary portion 144, and welding ribs disposed so as to surround the flap portions 147, 147 in the base portion 145 of the intermediary portion 144. The first welding ribs 148a herein described equate to the "first welding ribs" in the present invention, and the second welding ribs 148b herein described equate to the "second welding ribs" in the present invention.

The concrete construction in which the first welding ribs 148a configured as described above are vibration-welded with a priority higher than the second welding ribs 148b is illustrated with reference to FIG. 4 and FIG. 5.

As shown in FIG. 4, this embodiment provides such a configuration that the height (height from the topside bottom portion 142a to the topside apex portion 142b) H1 of each of the first welding ribs 148a disposed in a peripheral area of the opened-up portion of each of the flap portions 147 among the plurality of welding ribs 148, specifically in the portion most close to the opened-up end 149 of each of the flap portions 147 or the portion most close to the tear lines 150 of the top portion 141 becomes higher than the height H2 of each of the second welding ribs 148b, which are of other than the first welding ribs 148a and adjoin thereto. In the case that this configuration is employed, the top portion 141 and the intermediary portion 144 (the base portion 145 and the flap portions 147) on the side of the frame-like body 142 extend substantially in parallel, gaps between the top portion 141 and the intermediary portion 144 are substantially uniform in respective portions, and the first welding ribs 148a vertically disposed with a height higher than the second welding ribs 148b contact the top portion 141 with a priority higher than the second welding ribs 148b when allowed to contact and welded thereto by vibration welding. In consequence, vibration energy during vibration welding tends to be concentrated to the first welding ribs 148a compared to the second welding ribs 148b, and the strength of the welded joint, which is joined by being welded through the intermediary of the first welding ribs 148a, for the peripheral area of the opened-up portion of each of the flap portions 147 is enhanced. Therefore, the strength of the airbag cover in the peripheral area of the opened-up portion of each of the flap portions 147 can be secured.

Furthermore, as shown in FIG. 5, this embodiment provides such a configuration that the height (height from the topside bottom portion 142a to the topside apex portion 142b) H1 of each of the first welding ribs 148a disposed in a peripheral area of each of the hinge portions 146 among the plurality of welding ribs 148, i.e., in the portion most close to the hinge portion 146 or the portions most close to the tear lines 150 of the top portion 141 becomes higher than the height H2 of each of the second welding ribs 148b, which are of other than the first welding ribs 148a and adjoin thereto. In the case that this configuration is employed, the top portion 141 and the intermediary portion 144 (the flap portions 147) on the side of the frame-like body 142 extend substantially in parallel, and the first welding ribs 148a contact the top portion 141 with a priority higher than the second welding ribs 148b when allowed to contact and welded thereto by vibration welding. In consequence, vibration energy during vibration welding tends to be concentrated to the first welding ribs 148a compared to the second welding ribs 148b, and the strength of the welded joint, which is joined by being welded through the intermediary of the first welding ribs 148a, for the peripheral area of the hinge portions 146 is enhanced. As a result, the strength of the airbag cover in the peripheral area of the hinge portions 146 can be secured.

It is noted that although, in this embodiment, a case is described in which a configuration (welding rib construction A) having the first welding ribs 148a disposed in a peripheral area of the opened-up portion of each of the flap portions 147 as shown in FIG. 4 is employed and another configuration (welding rib construction B) having the first welding ribs 148a disposed in a peripheral area of the hinge portions 146 as shown in FIG. 5 is also employed, it may be possible in the present invention that at least one of the welding rib construction A and the welding rib construction B is employed depending on needs.

The operation of the airbag device 100 configured as described above is referred to FIG. 6. Here, a sectional construction of the airbag device 100 of this embodiment when the airbag cover 140 is opened up is shown in FIG. 6.

Figure 6:
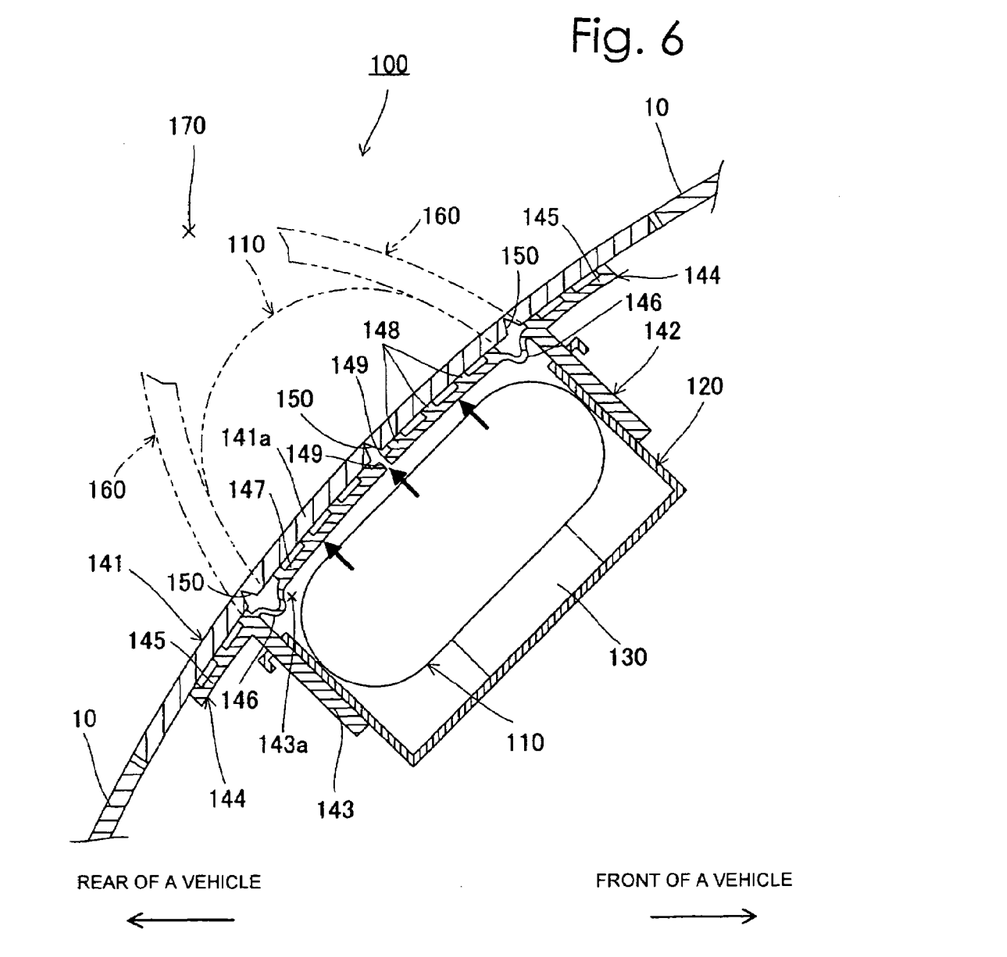
FIG. 6 is a view showing a sectional construction of the airbag device of this embodiment when the airbag cover is opened up.

Upon a vehicle accident, if a vehicle collision is detected or a collision is predicted by a sensor (not shown) installed in the vehicle, the airbag device 100 is activated and inflation gas is supplied from the inflator 130 to the airbag 110, thereby expanding as projecting outward from the retainer 120 toward the direction of arrows in FIG. 6. The direction is substantially same as the direction toward an occupant restraining region 170, where an occupant on a passenger seat is restrained, i.e., the region where the occupant on the passenger seat exists. At this time, the flap portions 147, 147 are pushed by the expansion load of the airbag 110 and a development operation of the side of the top portion 141 starts through the intermediary of the hinge portions 146, 146. Due to the further expansion operation of the airbag 110, the top portion 141 is torn at the tear lines 150 and the plate-like opening door portions 160 each constituted of the opening portion 141a and the flap portion 147, which are joined by being welded to each other, are each opened as one integrated piece. Thus, the airbag 110, which is allowed to project outward from the airbag cover 140 through the upper opening 143a due to a deployment of the opening door portions 160, expands to the occupant restraining region 170 under a state of being subjected to reduced resistance at the time when having projected outward from the airbag cover 140, and quickly restrains the occupant on the passenger seat. Therefore, it becomes possible to improve the restraint performance for an occupant on a passenger seat in the event of a vehicle accident.

According to this embodiment as described above, it becomes possible to enhance the strength of the welded joint for the peripheral area of the opened-up portion of each of the flap portions 147 or the peripheral area of each of the hinge portions 146 between the top portion 141 of the airbag cover 140 constituting the opening door portions 160 and the intermediary portion 144 joined to the backside of the top portion 141 through the plurality of welding ribs 148, thereby materializing an airbag cover 140 having the secured strength of the peripheral area, and an instrument panel 10 into which the airbag cover is integrated.

According to this embodiment, it is also possible to materialize an airbag device 100 equipped with an airbag cover 140, wherein the strength of the peripheral area of the opened-up portion of each of the flap portions 147 or the peripheral area of each of the hinge portions 146 of which is secured.

The present invention is not limited to the above embodiment, but a variety of applications and modifications may be considered. For example, the following embodiments modified from the above embodiment can be implemented.

In the configuration of the above embodiment, the top portion 141 and the intermediary portion 144 extend substantially in parallel. Gaps between the top portion 141 and the intermediary portion 144 are substantially uniform in respective regions, and the first welding ribs 148a are vertically disposed with a height higher than the second welding ribs 148b. However, in the present invention, it is enough if a configuration meets a condition that the first welding ribs 148*a* each have a vertical height so as to contact the top portion 141 with a priority higher than the second welding ribs 148*b*, and therefore the relative heights of the first welding ribs 148*a* and the second welding ribs 148*b* can be adjusted depending on needs. For example, if gaps between the top portion 141 and the intermediary portion 144 are different to each other in the whole or a part of the area, not only the configuration where the vertical height of each of the first welding ribs 148*a* is higher than that of each of the second welding ribs 148*b*, but also the configuration where the vertical height of each of the first welding ribs 148*a* is lower than that of each of the second welding ribs 148*b* can be employed.

Likewise, in the above embodiment, the only case illustrated is that only the flap portions 147 of opening door portions 160 are each provided the plurality of welding ribs 148. However, in the present invention, a plurality of welding ribs can be provided to at least one side of the opening portions 141*a* and the flap portions 147. For example, the configuration where a plurality of welding ribs are provided only to the opening portions 141*a*, or the configuration where a plurality of welding ribs are provided to both the opening portions 141*a* and the flap portions 147 can be also employed.

Additionally, in the above embodiment, a pair of opening door portions 160 subjected to the expansion load of the airbag 110 are opened up. However, the number of the opening door portions 160 can be changed depending on needs. For example, a configuration where a single opening door portion is opened up, or three or more opening door portions are opened up may be employed.

The disclosure of Japanese Patent Application No. 2008-026774, filed on Feb. 6, 2008, is incorporated in the application.

While the invention has been explained with reference to the specific embodiments of the invention, the explanation is illustrative and the invention is limited only by the appended claims.

What is claimed is:

1. An airbag cover for covering an airbag for a passenger seat of a vehicle, comprising:
    a casing for accommodating the airbag;
    a top portion for covering the airbag accommodated in the casing;
    a tear line formed in the top portion for tearing the airbag cover;
    an opening portion formed in the top portion and partitioned by the tear line;
    an intermediary portion provided on a backside of the top portion and interposed between the top portion and the airbag accommodated in the casing, said intermediary portion having a flap portion extending so as to face the opening portion for opening toward the opening portion and a hinge portion, the flap portion pivoting at the hinge portion; and
    a plurality of welding ribs vertically disposed between the intermediary portion and the top portion so that the intermediary portion is integrally vibration-welded to the top portion through the welding ribs, the welding ribs having a first welding rib disposed in at least one of a peripheral area of the flap portion and a peripheral area of the hinge portion, and a second welding rib other than the first welding rib;
    wherein the first welding rib has a vertical height so as to contact the top portion before the second welding rib does when the intermediary portion is welded to the top portion by vibration welding so that the first welding rib has a strength of a welded joint greater than that of the second welding rib.

2. The airbag cover according to claim 1, wherein the first welding rib has a vertical height greater than that of the second welding rib at a time of the vibration welding.

3. The airbag cover according to claim 2, wherein the flap portion is arranged such that the flap portion is opened as being pivoted at the hinge portion serving as a pivot point toward a side of the occupant together with the opening portion, said opening portion being torn at the tear line by an expansion of the airbag.

4. The airbag cover according to claim 2, wherein the first welding rib has a first rectangular shape portion located inside the flap portion, and a second rectangular shape portion located outside the flap portion to surround the first rectangular shape portion.

5. An instrument panel extending longitudinally in a lateral direction of a vehicle in front of a front seat thereof, wherein the airbag cover according to claim 1 is integrated therein in a unified manner.

6. An airbag apparatus for a passenger seat of a vehicle, comprising:
    an airbag for expanding toward an occupant on the passenger seat upon occurrence of an accident, and restraining the occupant;
    a gas supply device for supplying gas to the airbag; and
    the airbag cover according to claim 1.

7. A casing device for accommodating an airbag for a passenger seat of a vehicle, comprising:
    a casing for accommodating the airbag;
    an intermediary portion for covering the casing, adapted to be attached to a backside of a top portion of an airbag cover, the intermediary portion being interposed between the top portion and the airbag in a state of being accommodated, and having a hinge portion and a flap portion for opening pivoting at the hinge portion; and
    a plurality of welding ribs vertically disposed on the intermediary portion so that the intermediary portion is adapted to be integrally vibration-welded to the top portion at the welding ribs, the welding ribs having a first welding rib disposed in at least one of a peripheral area of the flap portion and a peripheral area of the hinge portion, and a second welding ribs other than the first welding rib;
    wherein the first welding rib has a vertical height so as to contact the top portion before the second welding rib does when the intermediary portion is welded to the top portion by vibration welding.

8. The casing device according to claim 7, wherein the first welding rib has a vertical height greater than that of the second welding rib at a time of the vibration welding.

9. The casing device according to claim 8, wherein the flap portion is arranged such that the flap portion is opened as being pivoted at the hinge portion serving as a pivot point toward a side of the occupant together with the opening portion by an expansion of the airbag.

* * * * *